United States Patent Office.

CLEMENT F. HINMAN, OF CHICAGO, ILLINOIS.

Letters Patent No. 99,088, dated January 25, 1870.

IMPROVEMENT IN THE MANUFACTURE OF COMPOSITION-ROOFS.

The Schedule referred to in these Letters Patent and making part of the same.

I, CLEMENT F. HINMAN, of the city of Chicago, in the county of Cook, and State of Illinois, have invented certain new and useful Improvements in Composition-Roofs; and I do hereby declare that the following is a full, clear, and exact description thereof.

The various roofing-compositions in use, have for their principal part, tar, pitch, or bitumen, in some form, all of which substances are extremely susceptible to change from variations of temperature, heat rendering the same soft, even to liquidity, and cold, hard, to the extreme of brittleness.

I am aware that various means have been adopted to obviate this difficulty. In my former patent, I use glycerine and dissolved rubber; the former, to soften the composition; the latter, to prevent evaporation.

The object of my present invention is to provide a composition-roof which shall be but little affected by changes of temperature, which shall remain firm, and yet be pliable at all seasons, and which can be made more cheaply than by the use of materials named in my former patent.

In making my improved roof, I use two compositions.

The first is prepared as follows:

To thirty gallons of coal-tar or other similar or suitable material, I add about three gallons of vegetable albumen, and about three hundred pounds of finely-ground or pulverized clay-slate, argillite, or other similar suitable material, admixing the whole thoroughly. This composition, I use for the first coat or body of the roof. By the use of vegetable albumen, the composition has a jelly-like nature or consistency, and will not be liquefied by heat or rendered brittle by cold. Heat coagulates albumen. The albumen, in its natural state, is soluble in water, but is insoluble when coagulated by heat. The composition above described, is applied to the roof hot. The vegetable albumen which I now use, is the residuum from the manufacture of beet-sugar, an article which has heretofore had no market value, and which I am able to utilize.

The second composition is prepared as follows:

In fifteen gallons of linseed-oil, I melt about three hundred pounds of resin, to which, when the same has cooled to about blood-heat, I add ten gallons of vegetable albumen, and thirty gallons of tar, and thicken the whole to the consistency of paint, by the addition of pulverized clay-slate. Or, omitting the tar, I thicken the composition by adding thereto, mineral paint, of any desired color.

I use this last-described composition as a kind of varnish or paint, for second coating composition-roofs laid with my first-described composition, applying the same, after the roofs have become partially dry, for the purpose of preventing further change in their condition by evaporation, and protecting the same against the action of water.

This second composition may also be applied, as a varnish or paint, to roofs made of materials other than my first-described composition, and may also be advantageously used for some other purposes, being well adapted to withstand climatic influences.

I also use this varnish or paint-preparation for the purpose of improving felting which has been saturated with tar, passing the felting through this varnish, giving it an additional coating, rendering it impermeable to air or water, and tougher and more flexible.

In laying my improved composition-roofs, I first put down a layer or layers of prepared felting, in the usual manner, and then apply my first-described composition, and when this has become sufficiently firm, I apply a coating of my above-described varnish or paint, thus enclosing the base or main material in a casing or envelope impermeable to air or water, and effectually preventing further evaporation or change.

In my second composition, the linseed-oil and resin form a varnish; the tar is used for cheapening; the vegetable albumen prevents the composition from becoming too hard.

In preparing my compositions, I do not confine myself to the exact proportions of the several ingredients named, as the same may be somewhat varied, without materially changing the nature or effect of the several compositions.

What I desire to secure by Letters Patent is as follows:

1. The use of vegetable albumen in roofing or mastic compositions, containing tar, pitch, bitumen, or other similar material, substantially as and for the purposes specified.

2. The roofing-composition hereinabove first described, consisting of tar, vegetable albumen, and mineral matter, substantially as and for the purposes specified.

3. The composition hereinabove last described, as a varnish or paint, composed of linseed-oil, resin, vegetable albumen, and mineral matter, either with or without tar, substantially as specified.

C. F. HINMAN.

Witnesses:
E. A. WEST,
O. W. BOND.